United States Patent
Boies et al.

(10) Patent No.: US 6,329,919 B1
(45) Date of Patent: Dec. 11, 2001

(54) SYSTEM AND METHOD FOR PROVIDING RESERVATIONS FOR RESTROOM USE

(75) Inventors: Stephen J. Boies, Mahopac, NY (US); Samuel Dinkin, Austin, TX (US); Paul Andrew Moskowitz, Yorktown Heights; Philip Shi-Lung Yu, Chappaqua, both of NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/639,254

(22) Filed: Aug. 14, 2000

(51) Int. Cl.[7] ..................................................... G08B 23/00
(52) U.S. Cl. ................................ 340/573.1; 340/825.28; 340/825.29; 705/5; 705/6
(58) Field of Search ................................ 340/539, 573.1, 340/540, 531, 825.28, 825.29; 705/5, 6; 701/201; 707/100; 395/205

(56) References Cited

U.S. PATENT DOCUMENTS

| | | | |
|---|---|---|---|
| 5,272,474 | * | 12/1993 | Hill .................................. 340/825.29 |
| 5,864,818 | * | 1/1999 | Feldman ............................... 395/205 |
| 5,948,040 | * | 9/1999 | DeLormet et al. ................... 701/201 |
| 5,963,948 | * | 10/1999 | Shilcrat ................................ 707/100 |
| 5,978,770 | * | 11/1999 | Waytena et al. .......................... 705/5 |

* cited by examiner

Primary Examiner—Benjamin C. Lee
(74) Attorney, Agent, or Firm—Morgan & Finnegan, L.L.P.

(57) ABSTRACT

The present invention is an apparatus, system, and method for providing reservations for restroom use. In one embodiment, a passenger on an airplane may submit a reservation request to the system for restroom use. The reservation system determines when the request can be accommodated and notifies the passenger when a restroom becomes available. The system improves airline safety by minimizing the time passengers spent standing while an airplane is in flight.

64 Claims, 4 Drawing Sheets

FIG.3A

| PASSENGER IDENTIFIER (SEAT NUMBER) | TIME RESERVATION REQUEST RECEIVED | RESERVATION NUMBER ASSIGNED | ORDER IN THE QUEUE |
|---|---|---|---|
| 3A | 10:05 AM | 17 | 3 |
| 12C | 9:55 AM | 16 | 2 |
| 21E | 9:50 AM | 15 | 1 |

FIG.3B

| PASSENGER IDENTIFIER (SEAT NUMBER) | TIME RESERVATION REQUEST RECEIVED | FIRST CLASS PASSENGER | PRICE OF TICKET PAID | FREQUENT FLYER STATUS | RESERVATION NUMBER ASSIGNED | ORDER IN THE QUEUE |
|---|---|---|---|---|---|---|
| 2B | 2:10 PM | YES | $1600 | YES | 22 | 1 |
| 12A | 2:08 PM | NO | $300 | NO | 24 | 3 |
| 27G | 2:09 PM | NO | $600 | YES | 23 | 2 |

SYSTEM AND METHOD FOR PROVIDING RESERVATIONS FOR RESTROOM USE

FIELD OF THE INVENTION

The present invention generally relates to a business method and more particularly, to an apparatus, method and system for providing reservations for restroom use.

BACKGROUND

The dangers of standing on an airplane while the airplane is in flight are well known. However, because of the shortage of restrooms on board, it is often necessary for passengers to stand for quite sometime in the aisles while queuing to use the restroom. Standing in the aisle of a moving aircraft creates safety hazard and inconveniences for both the passenger and other people on board. For example, a standing passenger may fall and injure himself or other passengers when the airplane encounters turbulence in the air. Likewise, a passenger may lose a great deal of his valuable time or miss a significant portion of an entertainment program because of waiting to use a restroom.

Similar safety concerns also exist with restroom uses on a passenger train or boat.

SUMMARY

A need therefore exists for an apparatus, system, and method for providing reservations for restroom use in places such as on an airplane, a passenger train or boat where safety concerns exist.

In one embodiment, the system provides reservations for restroom use on airplane which improves airline safety by minimizing the time passengers spent standing in the aisles. Passengers on an airplane may submit a reservation request for using the restroom. The reservation system processes the requests and assigns a reservation number for each request. The system then notifies the passenger when a restroom becomes available for his or her use.

BRIEF DESCRIPTION OF THE DRAWINGS

The accompanying drawings illustrate aspects of certain embodiments of the system.

FIG. 3 illustrates samples of the contents of the restroom reservation information stored in the database of the central controller.

DETAILED DESCRIPTION

Figure 1:
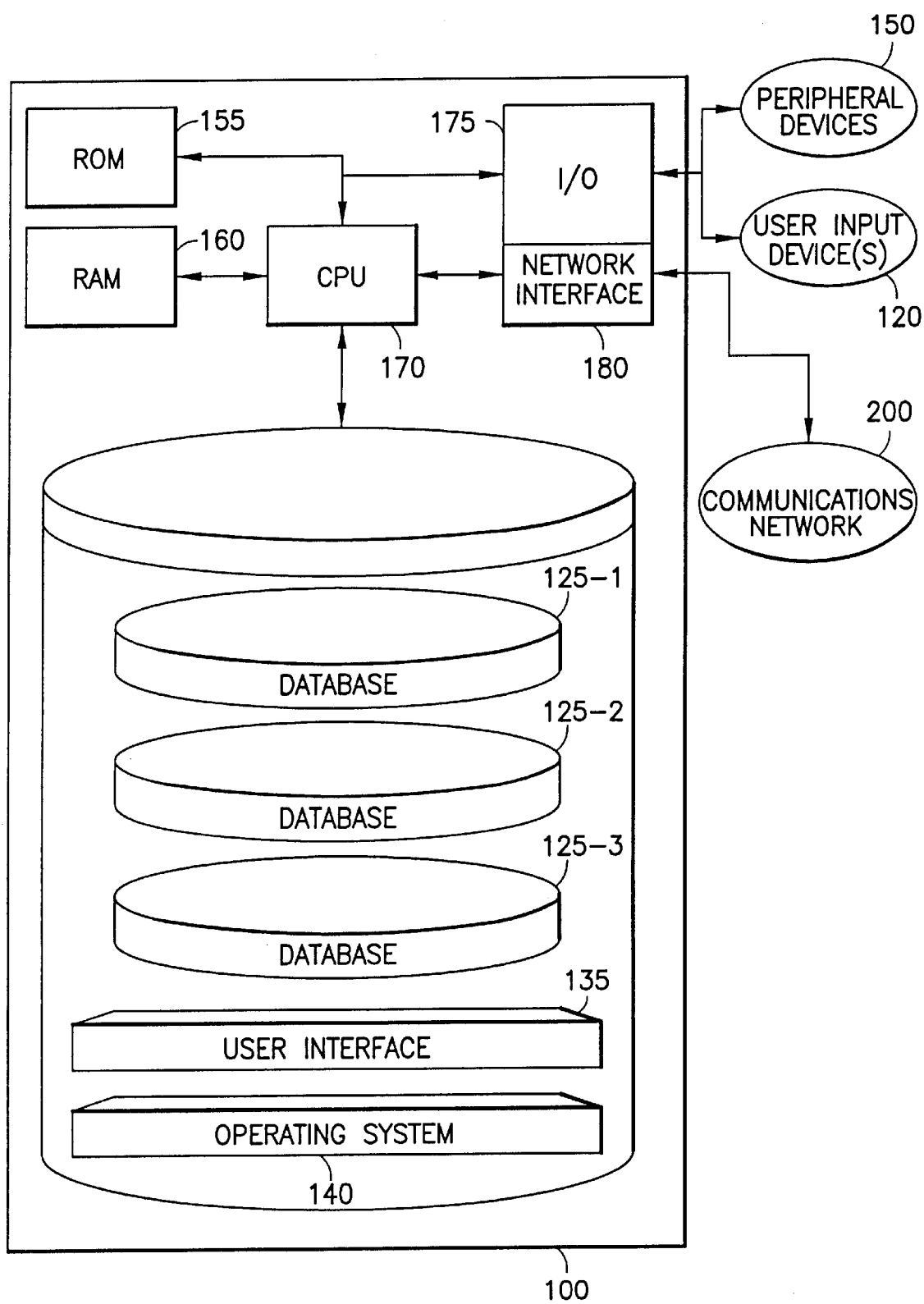
FIG. 1 illustrates a centralized controller according to one embodiment of the system.

FIG. 1 shows one embodiment of a system. In this embodiment, the system includes a centralized controller 100 configured to receive information from a communications network 200 through its input/output (I/O) facility 175, preferably, via a network interface 180. The I/O facility is capable of both receiving and sending information. Peripheral devices 150 may be attached to the centralized controller for any number of purposes including, but not limited to: printers for output, scanners for input, additional or alternative storage devices for data storage and retrieval, network interfaces for communication, and devices of the like. Also, the central controller may receive information from one or more users from user input device(s) 120.

A typical centralized controller may be based on common programmed computer systems that may include, but are not limited to, components such as: a central processing unit (CPU) 170; and various forms of memory such as, but not limited to: read only memory (ROM) 155, random access memory (RAM) 160, and a local storage device 110. The CPU is electronically coupled to each of the central controller's other elements. The CPU comprises at least one high-speed data processor adequate to execute program modules for executing user or system-generated requests. Preferably, the CPU is a conventional microprocessor such as the Intel Pentium Processor. The CPU interacts with RAM, ROM, and storage device(s) to execute stored program code according to conventional data processing techniques.

The local storage device may contain modules. These modules may include, but are not limited to, a user interface 135, an operating system 140, and database(s) 125. These modules may be stored and accessed from the local storage device(s) or from storage devices accessible through I/O. Although these modules typically and preferably are stored in a local storage device, they may also be stored in ROM, RAM, and peripheral devices or in remote storage facilities through a communications network.

The operating system is executable program code enabling the operation of a centralized controller. The operating system facilitates access of storage devices, I/O, network interfaces devices, peripheral devices, etc. The operating system preferably is a conventional product such as the Unix operating system or Microsoft Windows NT. The operating system, once executed by the CPU, interacts with ROM, RAM, I/O, peripheral devices, user input devices, storage devices, communications networks, program modules, and data, et al. Preferably, the operating system includes communication protocols that allow the centralized controller to communicate with other entities through a communications network. The preferable protocol is TCP/IP.

Figure 2:
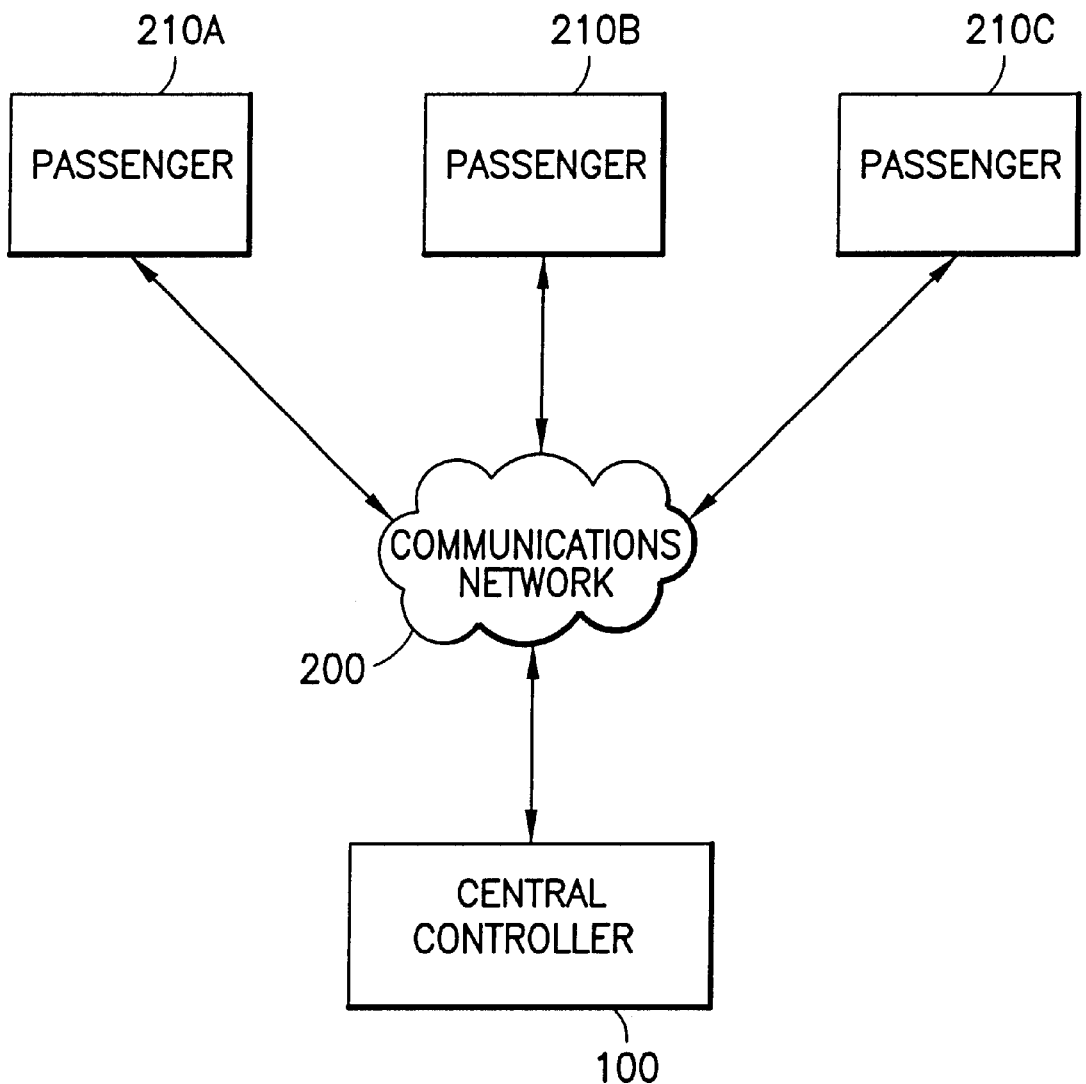
FIG. 2 illustrates the various interactions in one embodiment of the reservation system for restroom use.

FIG. 2 shows the basic interactions between the various airline passengers (210A–210C) and the central controller 100 in one embodiment of the system. The central controller may communicate with the passengers via a communications network 200. Examples of a communications network include but are not limited to a telephone network and a computer network. A passenger may use an in-flight telephone located near his seat or a button located near his seat to submit a reservation request to the central controller. Submission of such a request allows the central controller to determine the passenger's location on the airplane and to identify the passenger by his seat assignment.

FIGS. 3A–3B shows samples of the contents of airplane restroom reservation information stored in the database 125. FIG. 3A shows a sample of the contents of reservation information where reservation is granted in the order it is received. As shown in FIG. 3A, the information contains field corresponding to, for example, passenger identifier by seat assignment, time at which the reservation request is received, reservation number assigned, and current position in the queue. FIG. 3B shows a sample of the contents of reservation information where reservation is granted according to priority rules based on a number of factors. As shown in FIG. 3B, the information contains field corresponding to, for example, passenger identifier by seat assignment, passenger name, whether the passenger is flying first class, price the passenger paid for the ticket, frequent flyer status, time at which the reservation request is received, reservation number assigned, and current position in the queue.

Figure 4:
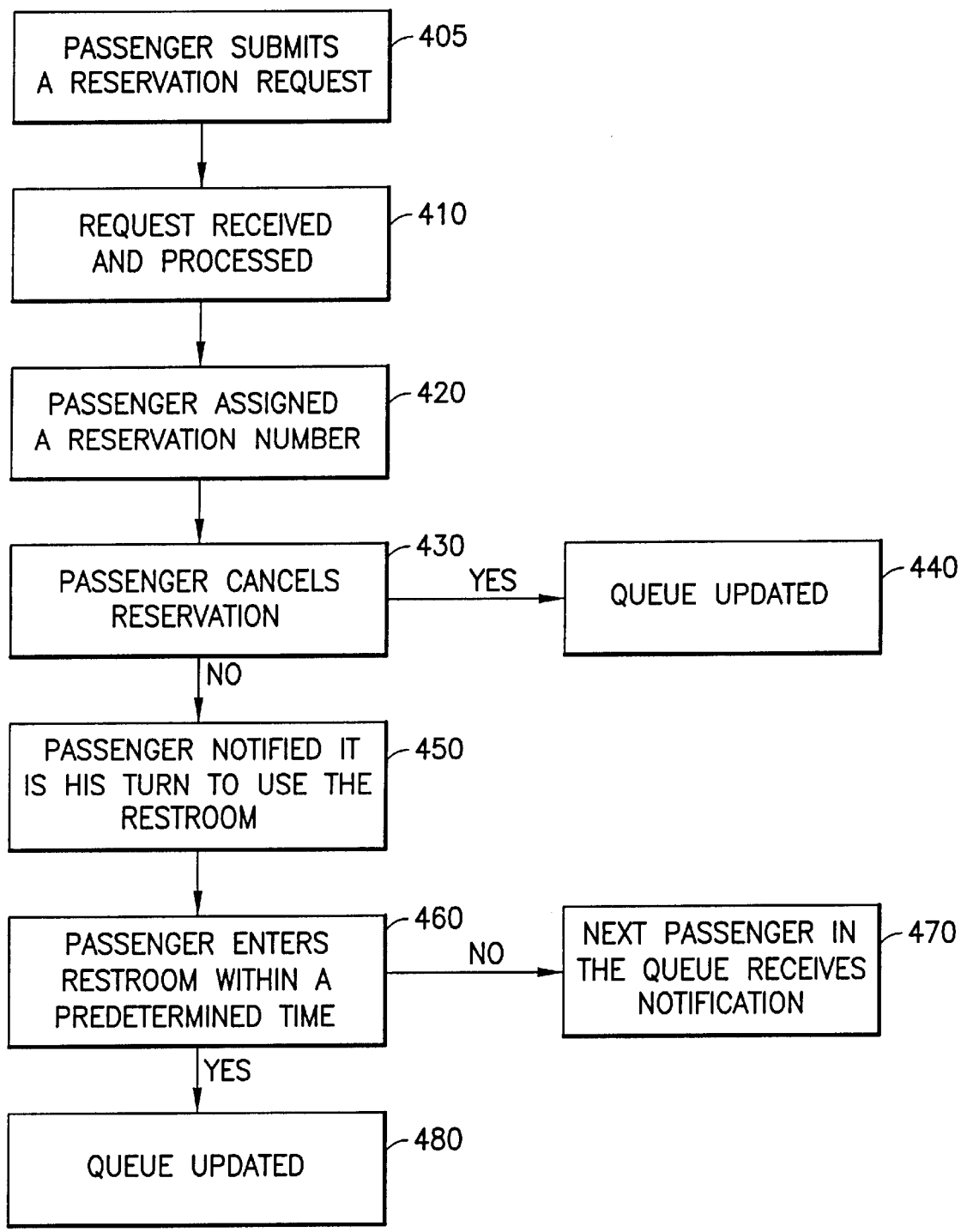
FIG. 4 is a flowchart illustrating a reservation request executed by one embodiment of the system.

FIG. 4 shows one embodiment of a reservation request executed by the system. The passenger on an airplane initiates a reservation request near his or her seat in step 405. The passenger may initiate a reservation request by using the telephone located near his seat or by pressing a button located near his seat. The reservation request is transmitted to the central controller 100 where the request is processed (step 410). The central controller determines the passenger's location on the airplane and identifies the passenger by his seat assignment. The central controller then assigns a reservation number to the passenger according to its rules (step 420). For example, the central controller may grant reservations on a first come, first served basis. In this case, the reservation is granted in the order it is received. Alternatively, the central controller may grant reservation according to a set of rules which determines priority based on information stored in the database such as whether the passenger is flying first class, whether the passenger is a frequent flyer of the airline, the price the passenger paid for his ticket, the location of the passenger's seat in the cabin, etc.

Once the central controller assigns a reservation number in response to a reservation request, the number is transmitted to the passenger. The number may be displayed on the television screen in front of the passenger seat, or displayed on a screen in front of the cabin where the safety signs are displayed. Alternatively, the passenger may receive the reservation number through a telephone call in which the information may be provided in a pre-recorded message format (e.g., "Your reservation number is 22."). In addition to the reservation number, the central controller may also provide the passenger with an approximate waiting time. The approximate waiting time may be determined based on the average time a passenger spent in a restroom and the passenger's current position in the queue.

A passenger with a reservation number may cancel his or her reservation at any time if desired (step 430). A passenger may cancel a reservation by using the telephone located near his seat or by pressing a button near his seat. Upon receiving the cancellation request, the central control updates the queue by removing the reservation from the queue (step 440). If a reservation is not cancelled, the central controller notifies the passenger when it is his or her turn to use the restroom (step 450). The notification may be provided through the television screen in front of the passenger's seat, a display in front of the cabin or a telephone call as described above. If a passenger enters the restroom within a predetermined time period or grace period following the notification (step 460), the central control updates the queue stored in the database (step 480) by removing the reservation from the queue. Likewise, if a passenger does not fulfill a reservation within a predetermined time or grace period, the central controller updates the queue and provides notification to the next passenger in the queue (step 470).

The central controller may employ a tracking system to detect the movement of a passenger and the status of the restroom. For example, when a passenger leaves his seat and arrives at the restroom in fulfillment of his reservation, a sensor may detect the passenger's departure from his seat and/or arrival at the restroom and transmits the signal to the central controller. Likewise, the central controller may receive a signal when a passenger leaves the restroom. The central controller updates the queue based on the information it receives.

In addition to monitoring the status of the restroom and the movement of passengers, the central controller may also monitor the status of the airplane. For example, when the airplane encounters unusual turbulence in the air, the central controller may temporarily halt the restroom use by withholding notifications to passengers who have made reservation for restroom use. Likewise, the central controller may halt the restroom use during landing and take-off of the plane.

As the system illustrated above provides reservations for restroom use on an airplane, it improves airline safety as well as saves passenger's valuable time by minimizing the time passengers spent on waiting for a restroom.

It is understood that the restroom reservation system of the invention can be used in places other than on an airplane. For example, the reservation system can be used for managing restroom use on a train or a bus where similar safety concerns exist. The invention could also find use in places such as restaurants or offices where restroom access is limited.

It will be apparent to those skilled in the art that various modifications and variations can be made in the system and processes of the present invention without departing from the spirit or scope of the invention. Thus, it is intended that the present invention cover the modifications and variations of this invention provided that they come within the scope of the appended claims and their equivalents. In this context, equivalents means each and every implementation for carrying out the functions recited in the claims, even if not explicitly described herein.

What is claimed is:

1. A method of providing reservations for restroom use, comprising:

receiving a reservation request from a user; and notifying the user when the restroom is available for his or her use.

2. The method according to claim 1, further comprising assigning a reservation number in response to the request.

3. The method according to claim 2, wherein said assigning the number assigns number based on a set of priority rules.

4. The method according to claim 2, wherein said assigning the number assigns number on a first come, first served basis.

5. The method according to claim 1, further comprising providing the user with an approximate waiting time.

6. The method according to claim 1, further comprising determining whether the reservation is cancelled.

7. The method according to claim 1, wherein said reservations are provided on an airplane.

8. The method according to claim 1, wherein said reservations are provided on a passenger train or boat.

9. The method according to claim 1, further comprising determining whether the user has entered the restroom within a predetermined time period.

10. A method of providing reservations for restroom use, comprising:

submitting a reservation request for restroom use; and receiving notification when the restroom becomes available for use.

11. The method according to claim 10, further comprising receiving a reservation number.

12. The method according to claim 11, wherein the reservation number is assigned based on a set of priority rules.

13. The method according to claim 11, wherein the reservation number is assigned based on a first come, first served basis.

14. The method according to claim 10, further comprising receiving an approximate waiting time.

15. The method according to claim 10, wherein said reservations are provided on an airplane.

16. The method according to claim 10, wherein said reservations are provided on a passenger train or boat.

17. An apparatus for providing reservations for restroom use, comprising:
a programmed computer, further comprising:
a memory having at least one region for storing executable program code; and
a processor for executing the program code stored in the memory, wherein the program code, further comprising:
code to receive a reservation request from a user; and
code to notify the user when the restroom is available for his or her use.

18. The apparatus according to claim 17, further comprising code to assign a reservation number in response to the request.

19. The apparatus according to claim 18, wherein said assigning the number assigns number based on a set of priority rules.

20. The apparatus according to claim 18, wherein said assigning the number assigns number based on a first come, first served basis.

21. The apparatus according to claim 17, further comprising code to provide the user with an approximate waiting time.

22. The apparatus according to claim 17, further comprising code to determine whether the reservation is cancelled.

23. The apparatus according to claim 17, wherein said reservations are provided on an airplane.

24. The apparatus according to claim 17, wherein said reservations are provided on a passenger train or boat.

25. The apparatus according to claim 17, further comprising code to determine whether the user has entered the restroom within a predetermined time period.

26. An apparatus for providing reservations for restroom use, comprising:
a programmed computer, further comprising:
a memory having at least one region for storing executable program code; and
a processor for executing the program code stored in the memory, wherein the program code, further comprising:
code to submit a reservation request for restroom use; and
code to receive notification when the restroom becomes available for use.

27. The apparatus according to claim 26, further comprising code to receive a reservation number.

28. The apparatus according to claim 27, wherein the reservation number is assigned based on a set of priority rules.

29. The apparatus according to claim 27, wherein the reservation number is assigned on a first come, first served basis.

30. The apparatus according to claim 26, further comprising code to receive an approximate waiting time.

31. The apparatus according to claim 26, wherein said reservations are provided on an airplane.

32. The apparatus according to claim 26, wherein said reservations are provided on a passenger train or boat.

33. Computer executable software code stored on a computer readable medium, the code for providing reservations for restroom use, comprising:
code to receive a reservation request from a user; and
code to notify the user when the restroom is available for his or her use.

34. The computer executable software code according to claim 33, further comprising code to assign a reservation number in response to the request.

35. The computer executable software code according to claim 34, wherein said assigning the number assigns number based on a set of priority rules.

36. The computer executable software code according to claim 34, wherein said assigning the number assigns number based on a first come, first served basis.

37. The computer executable software code according to claim 33, further comprising code to provide the user with an approximate waiting time.

38. The computer executable software code according to claim 33, further comprising code to determine whether the reservation is cancelled.

39. The computer executable software code according to claim 33, wherein said reservations are provided on an airplane.

40. The computer executable software code according to claim 33, wherein said reservations are provided on a passenger train or boat.

41. The computer executable software code according to claim 33, further comprising code to determine whether the user has entered the restroom within a predetermined time period.

42. Computer executable software code stored on a computer readable medium, the code for reservations for restroom use, comprising:
a programmed computer, further comprising:
a memory having at least one region for storing executable program code; and
a processor for executing the program code stored in the memory, wherein the program code, further comprising:
code to submit a reservation request for restroom use; and
code to receive notification when the restroom becomes available for use.

43. The computer executable software code according to claim 42, further comprising code to receive a reservation number.

44. The computer executable software code according to claim 43, wherein the reservation number is assigned based on a set of priority rules.

45. The computer executable software code according to claim 43, wherein the reservation number is assigned on a first come, first served basis.

46. The computer executable software code according to claim 42, further comprising code to receive an approximate waiting time.

47. The computer executable software code according to claim 42, wherein said reservations are provided on an airplane.

48. The computer executable software code according to claim 42, wherein said reservations are provided on a passenger train or boat.

49. A system for providing reservations for restroom use, comprising:
means for receiving a reservation request from a user; and
means for notifying the user when the restroom is available for his or her use.

50. The system according to claim 49, further comprising assigning a reservation number in response to the request.

51. The system according to claim 50, wherein said assigning the number assigns number based on a set of priority rules.

52. The system according to claim 50, wherein said assigning the number assigns number on a first come, first served basis.

53. The system according to claim 49, further comprising providing the user with an approximate waiting time.

54. The system according to claim 49, further comprising determining whether the reservation is cancelled.

55. The system according to claim 49, wherein said reservations are provided on an airplane.

56. The system according to claim 49, wherein said reservations are provided on a passenger train or boat.

57. The system according to claim 49, further comprising determining whether the user has entered the restroom within a predetermined time period.

58. A system for providing reservations for restroom use, comprising:

means for submitting a reservation request for restroom use; and means for receiving notification when the restroom becomes available for use.

59. The system according to claim 58, further comprising receiving a reservation number.

60. The system according to claim 59, wherein the reservation number is assigned based on a set of priority rules.

61. The system according to claim 59, wherein the reservation number is assigned based on a first come, first served basis.

62. The system according to claim 58, further comprising receiving an approximate waiting time.

63. The system according to claim 58, wherein said reservations are provided on an airplane.

64. The system according to claim 58, wherein said reservations are provided on a passenger train or boat.

\* \* \* \* \*

Disclaimer 6,329,919—Stephen J. Boies, Mahopac, New York; Samuel Dinkin, Austin, Texas; Paul Andre Moskowitz, Yorktown Heights; Phillip Shi-Lung Yu, Chappaqua, both of New York. SYSTEM AND METHOD FOR PROVIDING RESERVATIONS FOR RESTROOM USE. Disclaimer filed February 27, 2002, by assignee, International Business Machines Corporation.

Herby enter this disclaimer to claims 1-64 of said patent.

(*Official Gazette, April 2, 2002*)

(12) REEXAMINATION CERTIFICATE (4653rd)

United States Patent
Boies et al.

(10) Number: US 6,329,919 C1
(45) Certificate Issued: Oct. 8, 2002

(54) SYSTEM AND METHOD FOR PROVIDING RESERVATIONS FOR RESTROOM USE

(75) Inventors: Stephen J. Boies, Mahopac, NY (US); Samuel Dinkin, Austin, TX (US); Paul Andrew Moskowitz, Yorktown Heights, NY (US); Philip Shi-Lung Yu, Chappaqua, NY (US)

(73) Assignee: International Business Machines Corporation, Armonk, NY (US)

Reexamination Request:
No. 90/006,176, Feb. 12, 2002

Reexamination Certificate for:
Patent No.: 6,329,919
Issued: Dec. 11, 2001
Appl. No.: 09/639,254
Filed: Aug. 14, 2000

Disclaimer of Claims 1 to 64 Filed Feb. 27, 2002 (1257 OG 33)

( * ) Notice: This patent is subject to a terminal disclaimer.

(21) Appl. No.: 09/639,254

(51) Int. Cl.$^7$ ................................................ G08B 23/00
(52) U.S. Cl. .................. 340/573.1; 340/825.28; 340/825.29; 705/5; 705/6

(56) References Cited

U.S. PATENT DOCUMENTS 5,978,770 A * 11/1999 Waytena et al. .............. 705/5
6,237,872 B1 * 5/2001 Bar-Levav .............. 244/118.6

\* cited by examiner

*Primary Examiner*—Brent A. Swarthout

(57) ABSTRACT

The present invention is an apparatus, system, and method for providing reservations for restroom use. In one embodiment, a passenger on an airplane may submit a reservation request to the system for restroom use. The reservation system determines when the request can be accommodated and notifies the passenger when a restroom becomes available. The system improves airline safety by minimizing the time passengers spent standing while an airplane is in flight.

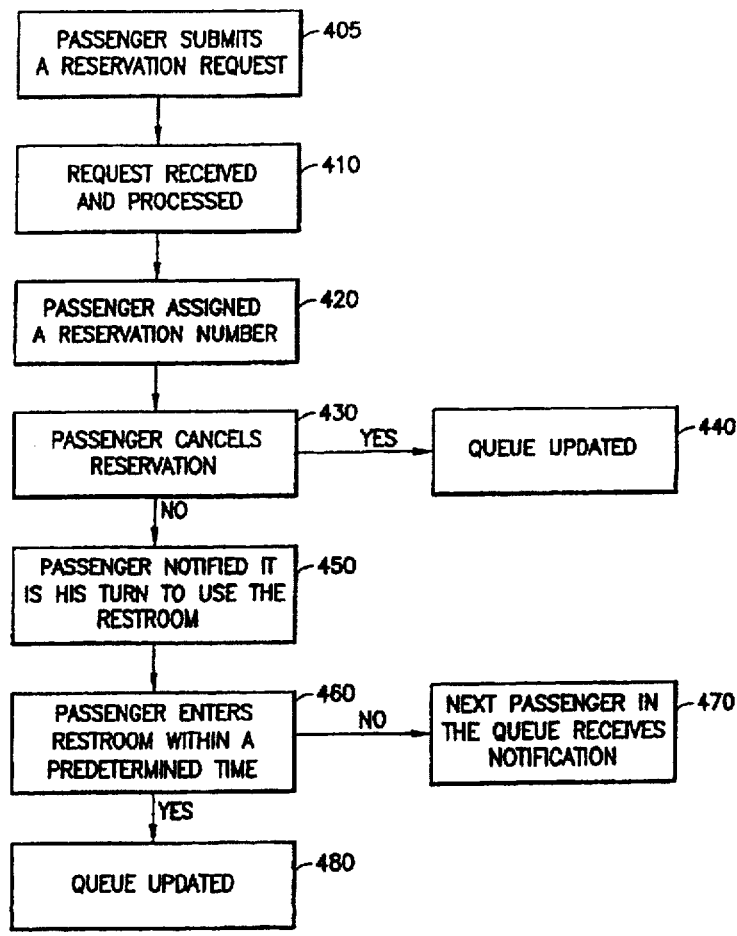

REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1–64 are now disclaimed.

* * * * *